July 18, 1967 C. C. ROECKS, JR., ET AL 3,331,563

REEL HUB

Filed April 8, 1965 3 Sheets-Sheet 1

INVENTORS
CARL C. ROECKS JR.
KAIL R. PETERSON

BY

July 18, 1967 C. C. ROECKS, JR., ET AL 3,331,563

REEL HUB

Filed April 8, 1965 3 Sheets-Sheet 2

INVENTORS
CARL C. ROECKS JR.
KAIL R. PETERSON

BY [signature]

July 18, 1967 C. C. ROECKS, JR., ET AL 3,331,563

REEL HUB

Filed April 8, 1965

3 Sheets-Sheet 3

INVENTORS
CARL C. ROECKS JR.
KAIL R. PETERSON
BY

[signature]

United States Patent Office 3,331,563
Patented July 18, 1967

3,331,563
REEL HUB
Carl C. Roecks, Jr., Phoenix, Ariz., and Kail R. Peterson, Menlo Park, Calif., assignors to General Electric Company, a corporation of New York
Filed Apr. 8, 1965, Ser. No. 446,616
11 Claims. (Cl. 242—55.12)

This invention relates to a device for supporting a member for rotational motion and more particularly to a hub for supporting a reel.

In the computer field, one commonly used data storage medium is an elongated tape of a flexible plastic material which has a magnetic coating applied to one side thereof. Such a medium is commonly referred to as magnetic tape. Magnetic tapes are employed in tape handlers which are devices in which tape from a supply reel is moved past a read-write head, where data is read from or written onto the tape, to a take-up reel where the tape is stored. The supply and take-up reels are each mounted on a separate reel hub which is connected to a drive motor. The drive motors rotate the take-up and supply reels in the correct directions and at the proper speeds so that tape is unwound from one reel and wound on the other reel at an appropriate rate.

In utilization of magnetic tape several criteria should be met. One of these criteria is the need for a hub which will facilitate the positioning of the reel on the hub. This positioning is important to insure proper reading and/or writing of the tape. A section of tape being read is aligned with the read-write head by guides on either side of the head. These guides press against both edges of the tape and steer the section of tape which is passing over the head. If a reel is not properly positioned on the hub, tape may scrape against the reel so that one edge of the tape may be damaged. When the damaged tape reaches the guides it will not be properly aligned on the read-write head by the guides and data stored on the tape may be improperly read or written by the head.

A further criterion which must be met is the positive retention of the reel on the hub. When a tape handler is employed in a high speed computer system, it must be capable of moving tape at high rate of speed in both forward and reverse directions and must also be capable of changing the direction of motion of the tape very rapidly. A reel filled with tape has a large amount of inertia which may cause slippage between the hub and the reel when there is a sudden change in the speed of rotation of the hub. When slippage does occur, the reel may fall off the hub and result in tape damage. To prevent this, the hub must be capable of maintaining a reel securely so the reel does not slip during sudden changes of speed of rotation of the hub.

Other criteria which must be met involve changing of tape reels. When the data stored on the tape of a given reel has been processed, this reel is removed and another reel containing tape having additional data is mounted on the hub. This substitution should be achieved in a minimum amount of time in order to efficiently utilize the tape handler. The hub used should facilitate rapid dismounting and mounting of the tape reels. To expedite this rapid changing of reels the hub used should eliminate dependency upon the operator for adjustment of the amount of coupling between the reel and the hub and should also require a minimum amount of oprator manipulation to change between the position in which the reel is securely mounted upon the hub and the position in which the reel is released.

The most widely presently used hub for supporting a tape reel having a central opening employs a cylinder having a flange extending radially outward from the cylindrical surface. A soft rubber ring is mounted upon the cylindrical surface between the flange and the end of the cylinder. This ring provides a supporting surface upon which the reel is placed. A circular face-plate having an axially extending rim is bolted on to the end of the cylinder adjacent the rubber ring. As the bolt is tightened the rubber ring is compressed between the rim of the face-plate and the flange on the cylindrical surface so that the rubber ring material expands radially outward, thereby gripping the inner surface of the central opening in the reel to effect a coupling between the hub and the reel. Continued tightening of the bolt through a number of revolutions increases the firmness of the reel mounting as the soft rubber material is further compressed against the central opening of the reel.

A major disadvantage of the above prior art hub is that the rubber material engages the inner surface of the central opening in the reel before the reel is completely pushed on to the hub so that, unless the operator exercises special care, the reel may be mounted in a skewed or other improper position. If the reel is improperly mounted, the edge of the tape can be damaged by scraping against the edge of the reel as the reel rotates. As stated earlier, tape so damaged does not align properly with the read-write head and data stored on the tape may be improperly read by the head.

Another disadvantage of the prior art hub is that firmness of the mounting depends upon the number of rotations of the bolt by an operator. If the bolt is not tightened a sufficient amount, slippage may occur between the hub and the reel when the rate of speed of rotation of the hub is changed suddenly. Conversely, if one operator tightens the bolt too snugly another operator may not be able to loosen the bolt and remove the reel. Also, as stated earlier, a number of revolutions of the bolt are necessary with the prior art hub to allow dismounting of one reel and mounting of another reel on the hub. As a result, a relatively long replacement time is required.

The present invention alleviates the disadvantages of the prior art by providing a hub having means for automatically aligning the reel on the hub and for retaining the reel in the proper position so that the reel will not slip off the hub during the time the hub is rotating. A quick attach and release mechanism is provided so that one reel can be quickly removed and another reel quickly mounted on the hub. This mechanism has two easily obtainable "stop" or terminal positions; a first position in which the reel is securely clamped to the hub and a second position in which the reel is released. The mechanism will normally be positioned in one of these two stop positions. Thus, the firmness of the mounting of the reel is not dependent upon an operator.

It is, therefore, an object of the present invention to provide a hub for supporting a tape reel which will assure proper positioning of the reel.

Another object is to provide a hub which insures a positive holding action on the tape reel.

A further object of this invention is to provide a hub which will facilitate the rapid mounting and dismounting of tape reels.

Still another object is to provide a hub which is positive in its action and will eliminate dependence upon an operator for adjustment of the holding force on the reel.

A still further object is to provide an improved hub which assures proper positioning of a reel, is positive in its action, allows rapid substitution of one reel for another, and eliminates dependency upon an operator for the amount of coupling between the reel and the hub.

The foregoing objects are achieved, in the instant invention, by providing a hub comprised of a cylindrical surface adapted for insertion into the central opening in a reel and a clamping means which forces the reel into proper position on the hub. The clamping means includes a resilient member and a gripping means. The gripping means is mounted on the resilient member and is moved, by an actuating means, both radially outward from the cylindrical surface and axially with respect to this surface. This movement causes the gripping means to contact the reel along the inner surface of the central opening and to also engage the side-wall of the reel around the central opening so that the reel is clamped in proper position on the hub. The actuating means has two "stop" positions. In one stop position the actuating means forces the gripping means securely against the reel and in the other stop position the actuating means permits the clamping means to release the reel under the force exerted by the resilient member.

Other objects and advantages of the present invention will be apparent from the following specification when taken in conjunction with the accompanying drawings wherein.

Figure 1:
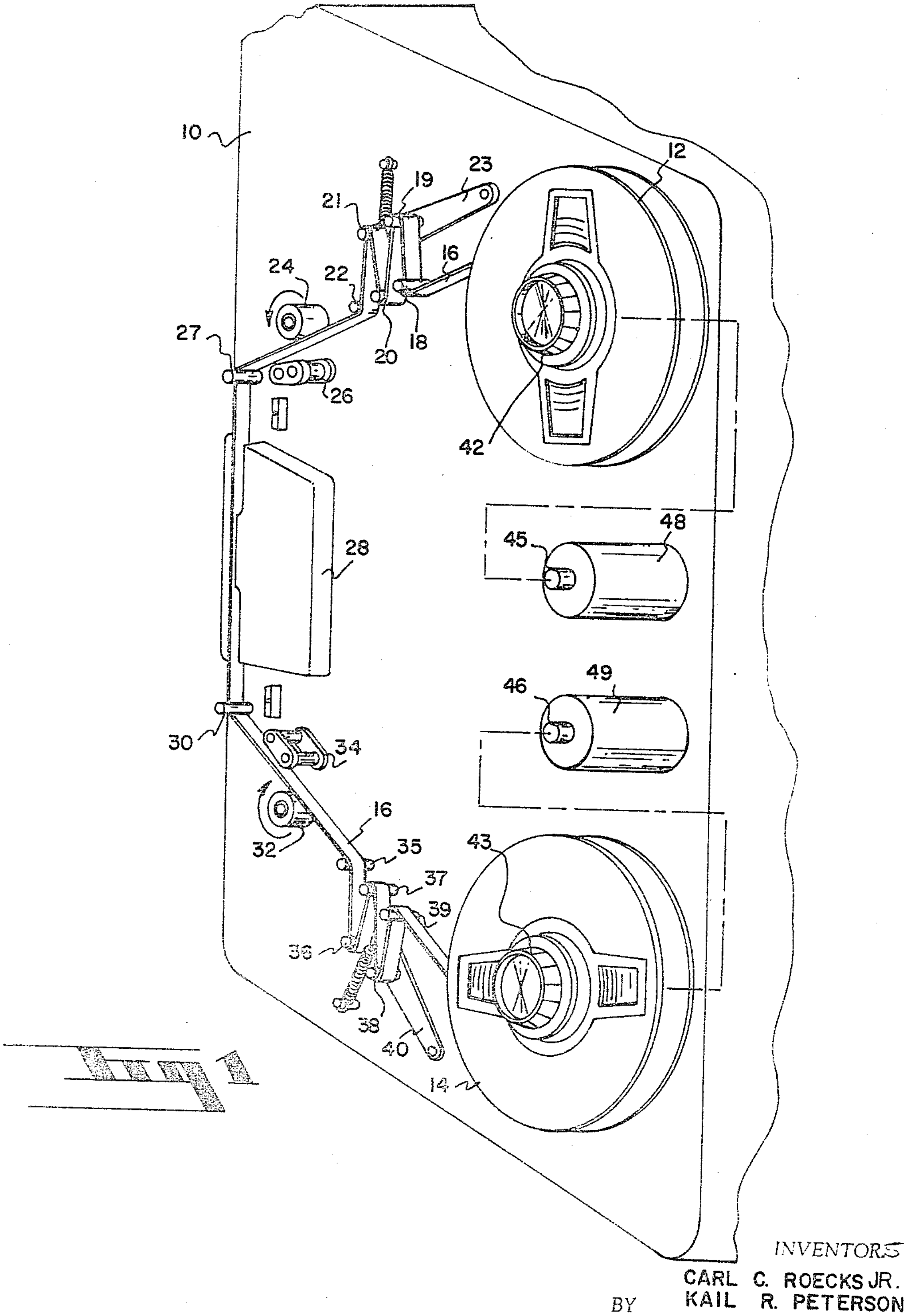
FIG. 1 is a perspective view of a tape handler embodying the instant invention.

With reference now to FIG. 1, there is illustrated an apparatus such as might utilize the reel hub of the present invention. As shown, there is provided a panel 10 upon which the remaining components of the apparatus, including two storage reels 12 and 14, are mounted. Disposed upon the reels 12 and 14 is a quantity of storage medium in the form of an elongated tape 16 which passes from one reel to the other in either direction. In so passing, the tape 16 is wound over a plurality of rollers 18 through 22. Rollers 18, 20 and 22 are each mounted on a stationary stud or other suitable axle while the rollers 19 and 21 are rotatably mounted on studs which are secured to a moveable arm 23 and which is spring urged against the tape. The purpose of the rollers is for the buffering of shock and tape vibration, particularly during the starting and stopping of the tape such as is well known in the art. From the roller 22, the tape passes through an upward drive assembly comprising a capstan 24 and a pinch roller assembly 26, thence over a tape guide 27 to a read-write head 28. From head 28 it passes over a tape guide 30, through a downward drive assembly including a capstan 32 and a pinch roller assembly 34, and onto a second grouping of rollers 35 through 39 having an associated movable arm 40. The essential design and function of this later group of rollers and arm are the same as that described with respect to the similar elements positioned near reel 12.

It is the purpose of the above described apparatus to move the tape over the read-write head 28 in order that information may be written onto or read from the tape 16. In order that this information transfer may be properly accomplished, the tape must pass over read-write head 28 at a uniform rate of speed regardless of the direction in which it is going. This rate of speed is relatively high; e.g., 75 inches per second, and the direction of movement is often reversed quite rapidly. To achieve this function, the two capstans 24 and 32 are normally rotated at constant speed in opposite directions. As illustrated by the arrows in FIG. 1, capstan 24 is rotated in the counterclockwise direction while capstan 32 is rotated in the clockwise direction. The capstans 24 and 32 are given rotary motion through suitable motor drive means which are not shown but which may be of any of those well known in the art. Reels 12 and 14 are mounted on hubs 42 and 43, which may be the hubs of the present invention. The hubs 42 and 43 are connected respectively to shafts 45 and 46 of motors 48 and 49 so that the hubs and reels are given rotary motion by these motors. When it is desired to move the tape downward from reel 12 to reel 14, pinch roller assembly 34 is activated. The activated assembly 34 exerts a downward force against the tape to thereby move and hold tape 16 in frictional driving engagement with the rotating capstan 32. Rotating capstan 32 causes the tape to move from reel 12, past the read-write head 28 to reel 14. Movement of the tape upward from reel 14 to reel 12 is effected in a similar manner utilizing the rotating capstan 24 and its associated pinch roller assembly 26.

Figures 2, 3:
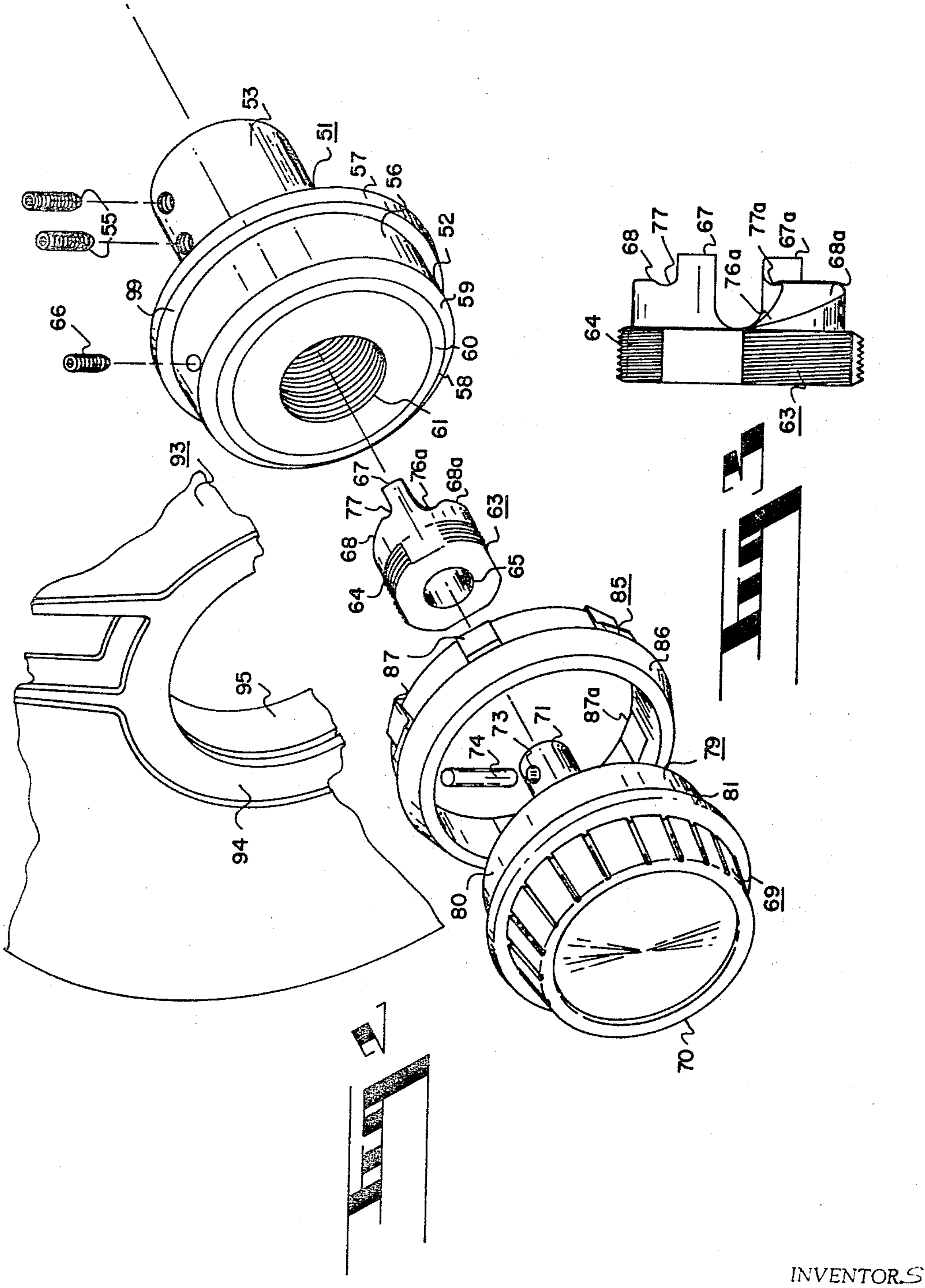
FIG. 2 is an exploded perspective view of the reel hub of the present invention.
FIG. 3 is an enlarged view, in side elevation, of one of the elements of the reel hub of the invention.
Figure 4:
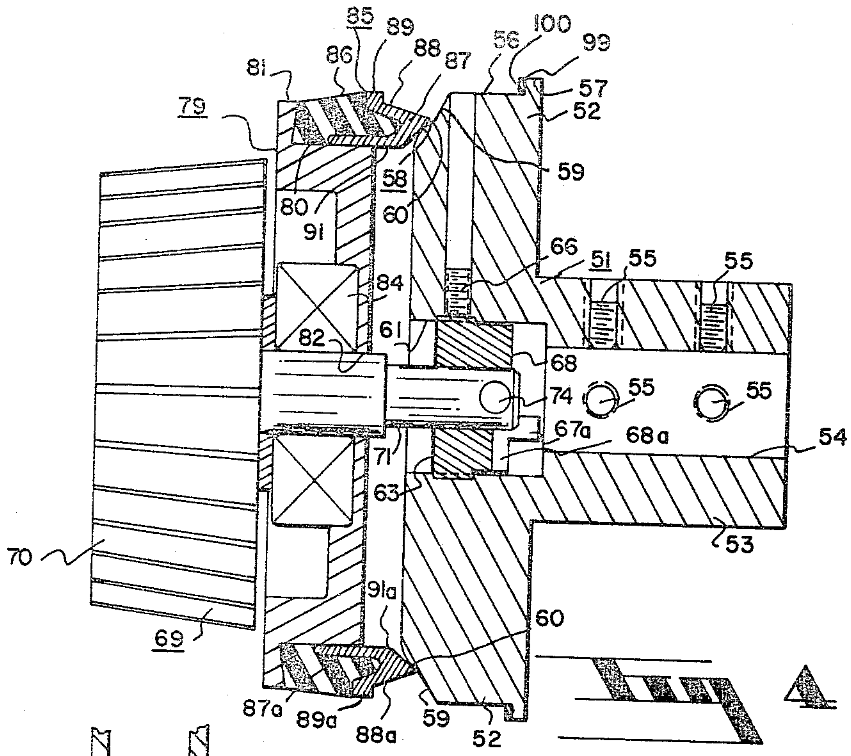
FIG. 4 is a cross sectional view, in side elevation, illustrating the hub of the present invention.

Referring now to FIGS. 2 through 6, there is illustrated an embodiment of the hub of present invention for use in an environment such as shown in FIG. 1. The hub includes a cylindrical body member 51 having an enlarged portion 52 and a reduced portion 53. The reduced portion 53 has an axially extending aperture 54 to provide a means for attaching the hub to the driving mechanism; for example, the shaft of motor 48 shown in FIG. 1 may be mounted within this aperture. The hub may be secured to the motor shaft by any suitable means; for example, by setscrews 55 as illustrated in FIGS. 2 and 4.

The enlarged portion 52 of body member 51 includes a cylindrical mounting surface 56 which serves to position a reel. At the end of the mounting surface adjacent the reduced portion of the body member 51 is a radially extending flange 57 which provides a positioning reference for the reel. At the other end of the mounting surface is a cam surface 58 which extends transversely to the cylindrical surface. This cam surface includes a beveled surface 59, and a circular bead surface 60. Surface 59 intersects the mounting surface 56 at an obtuse angle, while bead surface 60 is contiguous to the beveled surface 59 and has a diameter less than the cylindrical surface.

At the end of the enlarged portion 52 of body member 51 is a threaded aperture 61 extending along the axis of the cylinder. Adapted for mounting within aperture 61 is a cam member or plug 63 (FIGS. 2 and 3), having a threaded surface 64. Plug 63 is of substantially cylindrical configuration and includes an aperture 65 extending along its axis. When the hub is assembled for operation, plug 63 is screwed into the proper longitudinal position within aperture 61. A setscrew 66 is set tightly against plug 63 to prevent spurious longitudinal movement of the plug within aperture 61. In the illustrated embodiment plug 63 includes a pair of projections or stops 67 and 67*a* extending axially from one end thereof and spaced approximately 180 degrees apart. Between these stops are a pair of inclined cam surfaces 68 and 68*a*. The inclined surfaces will be described more fully hereinafter.

Cooperating with the plug 63 is a knob assembly 69 comprising a handle 70 secured to one end of a shaft 71 which is adapted for insertion into the aperture 65 of plug 63. A hole 73 extends transversely through the shaft near the other end of shaft 71. A pin 74 is adapted to be mounted in hole 73 with the pin protruding through the shaft so that the pin 74 extends approximately an equal distance on either side of the shaft.

In the assembled position of the hub, shaft 71 is free to rotate and to move longitudinally within aperture 65 of the plug. The rotation of shaft 71 causes pin 74 to move with one protruding portion of the pin in sliding contact with cam surface 68 and the other protruding portion of the pin in sliding contact with surface 68*a*. Cam surfaces 68 and 68*a* are each contoured so when pin 74 slides from a low end of the cam surface to a high end of the cam surface the pin causes the entire knob assembly 69 to move longitudinally from the left toward the right. When assembly 69 is rotated to the extreme counterclockwise position, one protruding portion of pin 74 is in contact with a low end 76*a* of cam surface 68*a* as shown in FIGS. 2 and 3. The other protruding portion of pin 74 is in contact with a low end (not shown) of surface 68. When assembly 69 is rotated to the extreme counterclockwise position, one protruding portion of pin 74 is in contact with a high end 77 of surface 68. The other protruding portion of pin 74 is in contact with a high end 77*a* of surface 68*a*.

Associated with the knob assembly is driving member 79 having a cylindrical surface 80 and a radially extending rim 81 at one end of surface 80. Member 79 includes an axially extending aperture 82 to facilitate the mounting of member 79 on the shaft 71 of the knob assembly. In the assembled position of the hub, driving member 79 is mounted on shaft 71 between the handle 70 and the plug with the rim 81 nearest the handle. Member 79 is supported by a portion of shaft 71 and is movable by handle 70. A bearing 84 mounted between handle 70 and the driving member 79 reduces friction between the handle and the driving member.

Located between driving member 79 and body member 51 is a clamping means 85 for securing a reel to member 51. This clamping means includes an annular resilient member or ring 86 and a plurality of gripping means or dogs 87 secured to ring 86. Ring 86 is composed of a suitable material such as rubber and is adapted for disposition about the cylindrical surface 80 of the driving member 79. The illustrated embodiment of the present invention employs six equally spaced dogs 87 made of a rigid material, although a greater or lesser number could be utilized. The dogs 87 include an outer surface 88, a flange 89 extending radially outward from one end of the outer surface and a contoured inner surface 91. The dogs are positioned adjacent the cam surface 58 on the enlarged portion of body member 51, with the flange 89 of the dog furthest from body member 51. The contoured inner surface 91 of the dogs is designed to mate with cam surface 58 on body member 51 so that forcing the dogs against the cam surface 58 causes the dogs to move radially outward and longitudinally parallel to the axis of the body member. This movement of the dogs provides the particular clamping action as will be explained in detail later. To obtain this movement, the dogs are forced against the cam surface 58 by an actuating means which includes knob assemly 69 and driving member 79.

Figure 5:
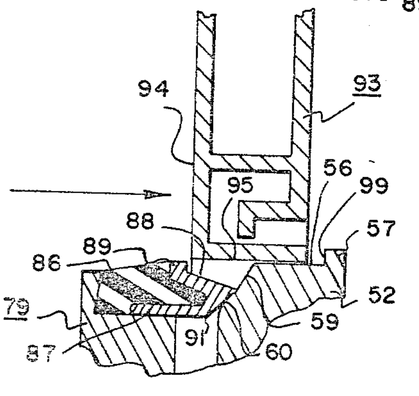
FIGS. 5 and 6 are cross sectional views of a portion of the hub of the present invention showing the clamping means in its two terminal positions.

In FIG. 2 there is shown a portion of a reel 93 having a front side-wall 94 and an inner surface 95 of the central opening of the reel. When a reel is moved onto or off of the hub, it is necessary that the knob assembly 69 be rotated to the extreme counterclockwise or "relaxed" position. In this relaxed position the protruding portions of pin 74 are in contact with the low ends of cam surfaces 68 and 68*a* so that knob assembly 69 is moved under contracting action of the ring, longitudinally toward the left to the position shown in FIG. 4. That is, the resilient ring 86, tending to return to the original size and shape provides energy which urges the dogs 87 radially inward toward the center axis of the hub, thereby forcing these dogs firmly against the bead surface 60 of body member 51. Due to the shape of the contoured inner surface 91 of the dogs and the bead surface 60, the dogs move to the left toward the handle 70 of the knob assembly. This movement of the dogs toward the handle moves ring 86 which forces the driving member 79 and the knob assembly to the left. This positions the dogs 87 toward the center axis of the hub so that the reel 93 can be moved over ring 86 and dogs 87 on to the mounting surface 56 as shown in FIG. 5.

The hub of the instant invention provides means for automatically aligning the reel on the hub. Thus, if the reel 93 has been pushed only partially on to the hub by an operator, the dogs 87 move the reel into proper operating position on surface 56 when assembly 69 is rotated clockwise. When the knob assembly 69 is rotated clockwise, pin 74 slides up the cam surface 68*a* from the low end 76*a* toward the high end 77*a* so that assembly 69 moves longitudinally toward the right. Handle 70 is moved longitudinally toward the right thereby forcing driving member 79 and resilient ring 86 toward the right. Ring 86 forces the dogs 87 against the cam surface 58, which causes the dogs to move radially outward and longitudinally to the right toward the body member 51. For example, when a single dog 87, shown in FIG. 5, is moved toward the right the contoured inner surface 91 of the dog slides up over surfaces 60 and 59. These surfaces move the dog 87 upward and longitudinally to the right to the position shown in FIG. 6. The inner surface 91 of the dog and cam surface 58 are contoured so that the dog 87 moves rapidly upward when the dog initially starts to move from the relaxed position, shown in FIG. 5, toward the extreme clockwise position shown in FIG. 6. This rapid upward movement causes the outer surface 88 of the dog to quickly engage the inner surface 95 of the reel 93. As knob assembly 69 is rotated further clockwise, pin 74 slides further toward the high end of cam surfaces 68 and 68*a* and moves the assembly 69 further longitudinally toward the right. The resilient ring 86 is moved toward the right and forces dog 87 to move further toward the right so that the flange 89 engages the front side-wall 94 of the reel 93. Further movement of the dog toward the right moves reel 93 toward the right, over the mounting surface 56, until a rear sidewall 97 of reel 93 makes firm contact with a front surface 99 of flange 57.

If assembly 69 is rotated clockwise when reel 93 is barely pushed on to the hub, the upper edge of flange 89 of the dog engages inner surface 95 of the reel almost immediately. The inner surface prevents the dog 87 from moving, which in turn prevents the handle 70 from being further rotated. Thus, it is obvious to the operator that the reel is improperly positioned. Even though the operator attempts to rotate the handle clockwise the reel will not be damaged because as previously stated, surfaces 91, 60 and 59 are contoured to cause dog 87 (FIG. 5) to move rapidly upward when the dog initially starts to move longitudinally toward the right. These contours cause most of the force exerted by the dog 87 to be against bead surface 60 and very little force to be exerted against the inner surface 95 of the reel.

Figure 6:
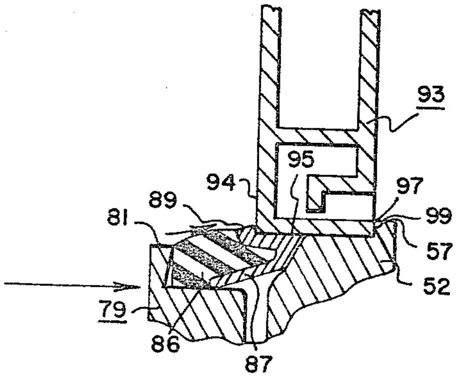

When the knob assembly 69 is rotated fully clockwise, the hub is in the "locked" operating position in which the protruding portions of pin 74 are in contact with the high ends 77 and 77*a* of cam surfaces 68 and 68*a* so that knob assembly 69 is moved longitudinally to the right. Handle 70 forces driving member 79 to the right which compresses the resilient ring 86 between the rim 81 of the driving member and the dog 87 to force the flange 89 of the dog firmly against the front side-wall 94 of the reel, as shown in FIG. 6. This forces reel 93 to the right and presses rear side-wall 97 of reel 93 firmly against flange 57 of the body member thereby locking reel 93 in proper operating position.

To enhance the coupling between the hub and the reel, front surface 99 of flange 57 can be coated with a layer of rubber 100 as shown in FIG. 4. This rubber aids in preventing slippage between the hub and the reel when the speed of rotation of the hub is changed suddenly.

The hub of the present invention also provides means whereby a reel can be quickly released and removed from the hub. In the illustrated embodiment, the rotation of the assembly 69 approximately 130 degrees counterclockwise from the locked position, slides pin 74 from the high end 77*a* of inclined surface 68*a* to the low end 76*a*. This movement of pin 74 allows handle 70 and member 79 to be moved longitudinally toward the left. The resilient ring 86, tending to return to the original size and shape, forces dogs 87 firmly against cam surface 58 on the body member and causes dogs 87 to move radially inward and longitudinally toward the left. Thus, ring 86 and dogs 87 move into the relaxed position, shown in FIGS. 4 and 5, and reel 93 can be removed from the hub.

Another reel can now be placed on the hub, handle 70 rotated approximately 130 degrees clockwise from the relaxed position and the reel is securely locked in the proper operating position as previously described.

The degree of coupling between the hub and the reel can be varied by adjusting the position of the plug 63 within the threaded aperture 61 of the body member. For example, the coupling between the hub and the reel can be increased by loosening the setscrew 66 (FIGS. 2 and 4), rotating plug 63 so that the plug moves toward the right inside aperture 61 and then resetting setscrew 66 tightly against plug 63. This causes knob assembly 69 and driving member 79 to be positioned longitudinally to the right of the original position (see FIG. 4). When assembly 69 is rotated clockwise to the locked position the resilient ring 86 is now compressed more tightly between rim 81 of the driving member and dogs 87 than before the plug was moved, thereby increasing the coupling between the hub and the reel.

Thus, the objects set forth herein are realized by the instant invention, wherein a novel hub provides a means for automatically positioning a reel on the hub. This invention provides a positive holding action by engaging both the inner surface of the central opening and the sidewalls of the reel and allows rapid substitution of one reel for another.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A hub for supporting a reel having an apertured central portion, said hub comprising: a body member adapted for insertion into said apertured central portion; clamping means for securing said reel to said body member, said clamping means including a plurality of discrete movable elements for contacting said central portion of said reel and a ring of resilient material for supporting said elements, said ring and said discrete elements forming a unitary structure; and means for moving said elements into contact with said central portion, said latter means imparting an axial and a radially-outward movement to said elements.

2. A hub for supporting a reel having an apertured central portion, said hub comprising: a body member having a longitudinal axis, said member including a surface adapted for insertion into the apertured central portion of a reel and a flange extending outwardly from one end of said surface and adapted to provide a reference surface against which a reel is positioned; a clamping means mounted contiguously to the end of said body member opposite said flange, said clamping means comprising a resilient member and a plurality of discrete movable elements secured to said resilient member and adapted to engage the central portion of a reel; and actuating means for simultaneously moving said elements outwardly from the axis of said body member and longitudinally with respect to the axis of said body member toward said flange for securing a reel on said body member against said flange.

3. A hub for supporting a tape reel having an apertured central portion, said hub comprising: a body member having a longitudinal axis, said member including a surface adapted for insertion into the apertured central portion of a tape reel and a flange extending outwardly from one end of said surface and adapted to provide a reference surface against which a reel is positioned; a clamping means mounted contiguously to the end of said body member opposite said flange, said clamping means comprising a resilient member and a gripping means, said gripping means being secured to said resilient member; and a means for causing said gripping means to simultaneously move outwardly from the axis of said body member and longitudinally with respect to the axis of said body member toward said flange so that the gripping means engages the central portion of the reel and secures the tape reel on said body member against said flange.

4. A hub for supporting a tape reel having a central opening defined by an inner surface and front and rear side-walls, said hub comprising: a body member including a portion having a cylindrical surface adapted for insertion into said central opening, a radially extending flange at one end of said cylindrical surface, and a cam surface at the other end of said cylindrical surface; a clamping means for securing said reel to said body member, said clamping means including a resilient member, and a plurality of gripping means secured to said resilient member and adapted to contact said reel, said gripping means having an outer surface, a flange extending radially outward from the outer surface, and a contoured inner surface for engagement with said cam surface of the body member; and actuating means for moving said resilient member axially in relation to said body member to force the contoured inner surface of said gripping means against the cam surface, said cam surface urging the gripping means radially outward as the gripping means is moved axially toward the body member whereby an axial and radially-outward movement is imparted to said gripping means to thereby cause the outer surface of said gripping means to engage the inner surface of the central opening and the flange of said gripping means to engage the front side-wall of the reel and secure the rear side-wall against the flange of said body member.

5. A hub for supporting a tape reel having a central opening defined by an inner surface and front and rear sidewalls, said hub comprising: a body member including a portion having a cylindrical surface adapted for insertion into said central opening, a radially extending flange at one end of said cylindrical surface, and a bead surface at the other end of said cylindrical surface; a clamping means for securing said reel to said body member, said clamping means including a resilient member, and a plurality of gripping means secured to said resilient member and adapted to contact said reel, said gripping means having an outer surface, a flange extending radially outward from the outer surface and a contoured inner surface for engagement with said bead surface of the body member; and actuating means for moving said resilient member axially in relation to said body member to force the contoured inner surface of said gripping means against the bead surface, said bead surface urging the gripping means radially outward as the gripping means is moved axially toward the body member whereby an axial and a radially-outward movement is imparted to said gripping means to thereby cause the outer surface of said gripping means to engage the inner surface of the central opening and the flange of said gripping means to engage the front side-wall of the reel and secure the rear side-wall against the flange of said body member.

6. A hub for supporting a tape reel having an apertured central portion, said hub comprising: a body member including a portion having a cylindrical surface adapted for insertion into said central opening, a radially extending flange at one end of said cylindrical surface, and a substantially circular bead surface at the other end of said cylindrical surface, said bead surface having a diameter less than said cylindrical surface; a clamping means for securing said reel to said body member, said clamping means including a resilient member mounted adjacent said bead surface, and a plurality of gripping means secured to said resilient member and adapted to contact said reel, said gripping means having a contoured inner surface for engagement with said bead surface of the body member; and actuating means for moving said resilient member axially in relation to said body member to force the contoured inner surface of said gripping means against the bead surface, said bead surface urging the gripping means radially outward as the gripping means is moved axially toward the body member whereby an axial and a radially-outward movement is imparted to said gripping means to thereby cause said gripping means to engage the central portion of the reel and secure the tape reel on said body member against said flange of said body member.

7. A hub for supporting a tape reel having a central opening defined by an inner surface and front and rear side-walls, said hub comprising: a body member including a portion having a cylindrical surface adapted for insertion into said central opening, a radially extending flange at one end of said cylindrical surface, and a substantially circular bead surface at the other end of said cylindrical surface, said bead surface having a diameter less than said cylindrical surface; a clamping means for securing said reel to said body member, said clamping means including a resilient member mounted adjacent said bead surface, and a plurality of gripping means secured to said resilient member and adapted to contact said reel, said gripping means having an outer surface, a flange extending radially outward from the outer surface and a contoured inner surface for engagement with said bead surface of the body member; and actuating means for moving said resilient member axially in relation to said body member to force the gripping means against the bead surface, said bead surface urging the gripping means radially outward as the gripping means is moved axially toward the body member whereby an axial and a radially-outward movement is imparted to said gripping means to thereby cause the outer surface of said gripping means to engage the inner surface of the central opening and the flange of said gripping means to engage the front side-wall of the reel and secure the rear side-wall against the flange of said body member.

8. A tape handler comprising: first and second reels for storing tape, each of said reels having an apertured central portion, said tape extending in a path between said first and said second reels; a read-write head adapted for writing information onto and reading information from said tape, said head being located along said path and adjacent said tape; a means for moving said tape past said head including a motor-driven capstan, a pinch roller to effect the engagement of said tape with said capstan, first and second reel motors for rotating said first and second reels, and first and second hubs for respectively securing said first reel to said first motor and said second reel to said second motor, each of said hubs comprising: a body member having a longitudinal axis and including a surface adapted for insertion into said apertured central portion and a flange extending outwardly from one end of said surface; clamping means for securing said reel to said body member, said clamping means being mounted contiguously to the end of said body member opposite said flange, said clamping means including a plurality of discrete movable elements for contacting said central portion of said reel and a resilient member, said elements being secured to said resilient member; and means for moving said elements into contact with said central portion, said latter means imparting an axial and a radially-outward movement to said elements.

9. A hub for supporting a tape reel having a central opening defined by an inner surface and front and rear side-walls, said hub comprising: a body member including a portion having a mounting surface adapted for insertion into said central opening, a flange extending radially outward from one end of said mounting surface, a beveled surface at the other end of said mounting surface, said beveled surface extending transversely to said mounting surface and intersecting said mounting surface at an obtuse angle, and an aperture extending longitudinally along the center axis of said body member; a cam member adapted for disposition within the aperture of said body member, said cam member having an inclined cam surface on one end; a clamping means for securing said reel to said body member, said clamping means including a resilient member and a plurality of equally spaced gripping means secured to said resilient member and adapted to contact said reel, said gripping means having an outer surface, a flange extending radially outward from the outer surface and a contoured inner surface for engagement with said beveled surface of the body member; and actuating means for moving said clamping means axially with respect to said body member and said reel, said actuating means including a portion disposed in sliding contact with said cam surface whereby movement of said portion over said cam surface moves said clamping means axially in relation to said body member to force the contoured surface of said gripping means against the beveled surface, said beveled surface urging the gripping means radially outward as the gripping means is moved axially toward the body member whereby an axial and a radially-outward movement is imparted to said gripping means to thereby cause the outer surface of said gripping means to engage the inner surface of the central opening and the flange of said gripping means to engage the front side-wall of the reel and force the rear side-wall against the flange of said body member.

10. A hub for supporting a tape reel having a central opening and front and rear side-walls, said hub comprising: a body member including a portion having a mounting surface adapted for insertion into said central opening, a flange extending radially outward from one end of said mounting surface, a cam surface at the other end of said mounting surface, said cam surface extending transversely to said mounting surface, and an aperture extending longitudinally along the center axis of said body member; a cam member adapted for disposition within the aperture of said body member, said cam member including an inclined cam surface on one end thereof; a clamping means for securing said reel to said body member, said clamping means including a resilient member and a plurality of gripping means secured to said resilient member and adapted to contact said reel, said gripping means having a contoured inner surface for engagement with said cam surface of the body member; and actuating means for moving said clamping means axially with respect to said body member and said reel, said actuating means including a portion disposed in sliding contact with said inclined cam surface whereby movement of said portion over said inclined cam surface moves said clamping means axially in relation to said body member to force the contoured inner surface of said gripping means against the cam surface of said body member, said cam surface of said body member urging the gripping means radially-outward as the gripping means is moved axially toward the body member whereby an axial and radially-outward movement is imparted to said gripping means to thereby cause said gripping means to engage said reel in the region of said central opening to thereby secure said reel about the mounting surface and against the flange of said body member.

11. A hub for supporting a tape reel having a central opening defined by an inner surface and front and rear side-walls, said hub comprising: a body member including a portion having a cylindrical surface adapted for insertion into said central opening, a radially extending flange at one end of said cylindrical surface, a cam surface at the other end of said cylindrical surface, said cam surface including a beveled surface extending transversely to said cylindrical surface and intersecting said cylindrical surface at an obtuse angle and a substantially circular bead surface contiguous to said beveled surface, said bead surface having a diameter less than said cylindrical surface, and a threaded aperture extending longitudinally along the center axis of said body member; a cam member adapted for disposition within the aperture of said body member, said cam member including a threaded surface, an inclined cam surface on one end thereof and an axially extending aperture, said cam member being mounted within the aperture of said body member with said inclined cam surface being farthest from the bead surface of said body member; a knob assembly including a handle, a shaft secured to said handle and adapted for support by and rotation within said cam member, and a pin secured to and extending transversely with respect to the shaft and disposed in sliding contact with said inclined cam surface whereby a rotational motion of said shaft produces a longitudinal motion of said knob assembly; means for limiting the extent of rotational motion of said knob assembly; a driving member supported by said shaft and movable by said knob assembly, said driving member having a cylindrical portion and a radially extending rim at one end of said cylindrical portion; and a clamping means for securing said reel to said body member, said clamping means including an annular resilient member disposed upon said cylindrical portion and abutting said rim of said driving member, and a plurality of equally spaced gripping means secured to said resilient member and adapted to contact said reel, said gripping means having an outer surface, a flange extending radially outward from the outer surface and a contoured inner surface for engagement with said cam surface of the body member whereby a longitudinal motion of the driving member forces the contoured inner surface of said gripping means against the cam surface of said body member, said cam surface of said body member urging the gripping means radially outward as the gripping means is moved axially toward the body member whereby an axial and a radially-outward movement is imparted to said gripping means to thereby cause the outer surface of said gripping means to engage the inner surface of the central opening and the flange of said gripping means to engage the front side-wall of the reel and force the rear side-wall against the flange of said body member.

References Cited

UNITED STATES PATENTS

| | | | |
|---|---|---|---|
| 1,981,563 | 11/1934 | McIlvreid et al. | 242—68.3 |
| 2,983,460 | 5/1961 | Wright | 242—68.3 |
| 3,000,582 | 9/1961 | Brede | 242—68.3 |
| 3,037,088 | 5/1962 | Berger et al. | 242—55.12 X |

LEONARD D. CHRISTIAN, *Primary Examiner.*